(12) United States Patent
Ku et al.

(10) Patent No.: US 7,723,429 B2
(45) Date of Patent: *May 25, 2010

(54) FLAME RETARDANT THERMOPLASTIC RESIN COMPOSITION

(75) Inventors: Jeong Hwan Ku, Gunpo-Si (KR); Sang Hyun Hong, Uiwang-si (KR); Su Hak Bae, Seoul (KR); Jin Hwan Choi, Anyang-Si (KR)

(73) Assignee: Cheil Industries, Inc., Gyungsangbuk-do (KR)

( * ) Notice: Subject to any disclaimer, the term of this patent is extended or adjusted under 35 U.S.C. 154(b) by 528 days.

This patent is subject to a terminal disclaimer.

(21) Appl. No.: 11/601,352

(22) Filed: Nov. 17, 2006

(65) Prior Publication Data

US 2007/0155875 A1 Jul. 5, 2007

(30) Foreign Application Priority Data

Dec. 29, 2005 (KR) .................. 10-2005-0133500
May 17, 2006 (KR) .................. 10-2006-0044262

(51) Int. Cl.
  *C08K 5/49* (2006.01)
(52) U.S. Cl. .................. 524/710; 524/508; 524/583; 524/706; 526/328; 526/329.3; 526/329.2; 526/335; 526/329.1
(58) Field of Classification Search ........... 526/328, 526/329.3, 329.2, 335, 329.1; 524/508, 583, 524/710, 706
  See application file for complete search history.

(56) References Cited

U.S. PATENT DOCUMENTS

| | | | |
|---|---|---|---|
| 3,849,368 A | 11/1974 | Anderson et al. | |
| 4,459,381 A | 7/1984 | Trivedi | |
| 4,618,633 A | 10/1986 | Taubitz | |
| 4,632,946 A | 12/1986 | Muench | |
| 5,030,674 A | 7/1991 | Notorgiacomo | |
| 6,054,515 A | 4/2000 | Blount | |
| 6,306,941 B1 | 10/2001 | Klatt et al. | |
| 2006/0183825 A1 | 8/2006 | Hong | |

FOREIGN PATENT DOCUMENTS

| | | | |
|---|---|---|---|
| DE | 42 09 029 A1 | | 9/1993 |
| DE | 19 637 368 | | 3/1998 |
| EP | 0 075 863 | * | 4/1983 |
| EP | 1 069 157 A1 | * | 1/2001 |
| EP | 1 069 157 A1 | | 7/2001 |
| EP | 1 262 519 | | 12/2002 |
| GB | 2 003 888 | | 3/1979 |
| JP | 61-009450 | | 1/1986 |
| JP | 61009450 | | 1/1986 |
| JP | 11-140270 | * | 5/1999 |
| WO | WO 2004 029143 | | 4/2004 |

OTHER PUBLICATIONS

Abstract of DE 4209029 published Sep. 23, 1993.
European Search Report completed Aug. 7, 2006 (for commonly owned EP application).
Abstract XP002393756 which relates to Abstract of JP 61009450 published Jan. 17, 1986.
Abstract of JP 61009450 published Jan. 17, 1986.
European Search Report for related application completed Mar. 12, 2007 with Annex.

* cited by examiner

*Primary Examiner*—Ling-Siu Choi
(74) *Attorney, Agent, or Firm*—Maria Parrish Tungol; John A. Parrish

(57) ABSTRACT

A polymer composition includes a rubber-modified aromatic vinyl resin and a cyclic phosphonate ester compound. Embodiments of the composition demonstrate good impact strength, flame retardancy, heat resistance. Some embodiments additionally demonstrate moisture resistance and low heat sag. A shaped article and an electronic device can be made from the flame retardant polymer composition.

20 Claims, 1 Drawing Sheet

FLAME RETARDANT THERMOPLASTIC RESIN COMPOSITION

CROSS-REFERENCE TO RELATED APPLICATIONS

This non-provisional application claims priority under 35 U.S.C. §119(a) to Korean Patent Application Nos. 2006-44262 filed on May 17, 2006 and 2005-133500 filed on Dec. 29, 2005, which are herein incorporated by reference in their entireties.

BACKGROUND

1. Field

The inventions relate to a flame retardant polymer composition that can be used to make molded articles with good physical and mechanical properties.

2. Description of the Related Technology

In general, rubber-modified aromatic vinyl resins show good processability, excellent physical properties, particularly, high impact strength and good appearance. Based on these advantages, rubber-modified aromatic vinyl resins have been widely applied to a variety of applications, including electrical and electronic products and office machines. However, these resins tend to burn out when they are applied to heat-emitting devices, such as computers and facsimile machines. Thus, methods for imparting flame retardancy to rubber-modified styrene resins are being developed.

A widely known method for imparting flame retardancy is the addition of a halogen-containing compound with an optional antimony catalyst. The inclusion of a halogen containing compound for flame retardancy may make the resin toxic. Therefore, non-halogenated compounds for use as flame retardants are desirable.

Other researchers have attempted to impart flame retardancy to rubber-modified aromatic vinyl resins by the addition of aromatic phosphates. However, this has resulted in the deterioration of physical and mechanical properties of the resin. In addition, the volatility of the phosphate results in impurities in the polymer resin. Since these compositions are also highly hygroscopic, special care is required in drying during processing when the composition is used as a flame retardant. In addition, molded articles manufactured from the composition by injection molding may suffer from deformation and serious variation in physical properties depending on the ambient atmospheric conditions, and thus there is a limitation in applying the composition to products.

SUMMARY

Described herein are polymer compositions. In some embodiments, the polymer compositions comprise a rubber-modified aromatic vinyl resin. In some embodiments, the polymer compositions also comprise a cyclid alkyl phosphonate ester. In one embodiments, the polymer composition may include about 100 parts by weight of a rubber-modified aromatic vinyl resin; and about 0.1 to about 10 parts by weight of a cyclic alkyl phosphonate ester compound represented by the following Formula (I):

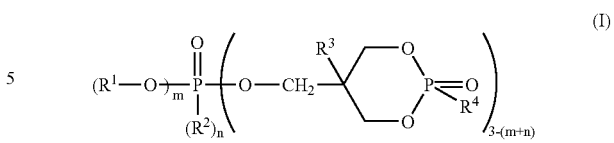

In Formula (I), $R^1$, $R^2$ and $R^4$ are independently $C_2$-$C_{10}$ alkyl group, $R^3$ is ethyl, m and n are independently 0, 1 or 2, and (m+n) is 1 or 2. In some embodiments, m is 1 or 2.

In certain embodiments, the composition is substantially free of polyphenylene ether resin. In some embodiments, the composition has less than 4 parts by weight of a polyphenylene ether resin, based on 100 parts by weight of the rubber-modified aromatic vinyl resin. In some embodiments, the composition has less than 2 parts by weight of the polyphenylene ether resin, based on 100 parts by weight of the rubber-modified aromatic vinyl resin. In some embodiments, the composition has less than 1 parts by weight of the polyphenylene ether resin, based on 100 parts by weight of the rubber-modified aromatic vinyl resin. In some embodiments, the composition comprises no polyphenylene ether resin. Certain of these embodiments have advantages over compositions which contain a polyphenylene ether resin.

As described above, the polymer composition may include a rubber-modified aromatic vinyl resin. In some embodiments, the rubber-modified aromatic vinyl resin comprises an aromatic vinyl graft copolymer resin and an aromatic vinyl copolymer resin, wherein the aromatic vinyl copolymer is not a graft copolymer resin. In some embodiments, the aromatic vinyl graft copolymer resin is a graft copolymer of a rubber, an aromatic vinyl monomer, and a vinyl monomer. In some embodiments, the aromatic vinyl copolymer resin is a copolymer of an aromatic vinyl monomer and a vinyl cyanide monomer. In some embodiments, the aromatic vinyl copolymer is substantially free of a rubber polymer. In some embodiments, the rubber modified aromatic vinyl resin is a mixture of g-ABS resin and SAN copolymer.

In some embodiments, the polymer compositions further includes an aromatic phosphate ester. In some embodiments, the aromatic phosphate ester is about 0 to about 20 parts by weight based on the rubber-modified aromatic vinyl resin and the polyphenylene ether resin totaling 100 parts by weight of the composition.

In some embodiment, the polymer composition further includes a thermoplastic resin.

In some embodiments, the aromatic phosphate ester is represented by the following Formula (II):

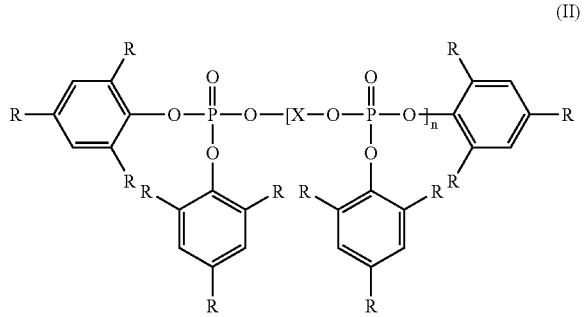

In formula (II) each R is independently hydrogen or $C_{1-4}$ alkyl, X is derived from an aryl compound comprising at least two hydroxy groups, and n is 0 to 4.

In some embodiments, the composition is in the form a shaped article.

In one embodiment, an electronic device, comprising the polymer compositions described herein. In another embodiment, a method of making an electronic device includes the steps of providing an electrical circuit; providing a housing comprising a portion; and enclosing the electrical circuit with the housing. In the foregoing embodiments, the portion may include embodiments of the polymer composition described herein.

Figure 1:
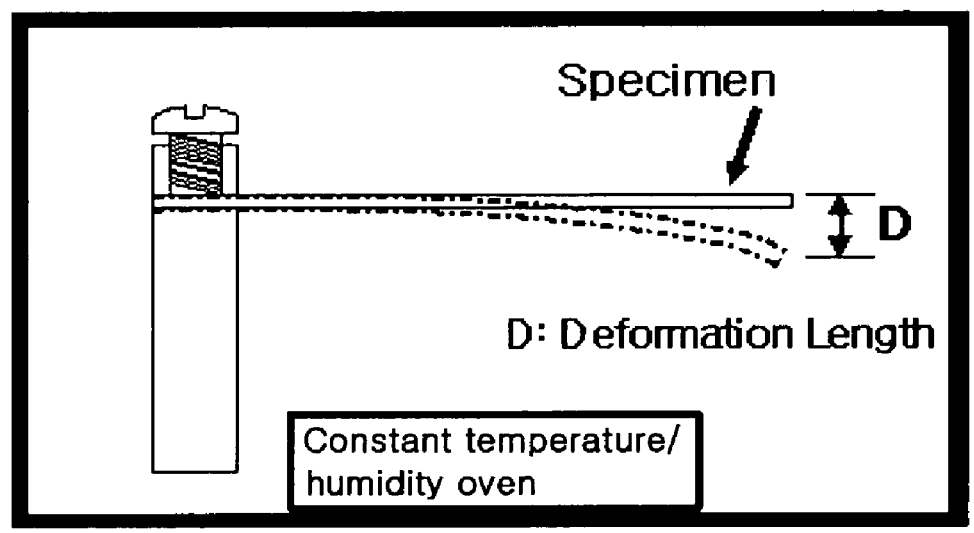
FIG. 1 is a cross-sectional view illustrating the measurement of heat sag, which is the deformation length D (reported as heat sag in Tables 1 and 2) via bending of a test specimen in a constant temperature/humidity oven for the evaluation of degree of thermal deformation.

Various features and advantages of the invention will be more clearly understood from the following detailed description of embodiments taken in conjunction with the accompanying drawing.

DETAILED DESCRIPTION OF THE EMBODIMENTS

As noted above, one aspect of this invention relates to a polymer composition. According to various embodiments, the polymer composition comprises a rubber-modified aromatic vinyl resin and a cyclic alkyl phosphonate compound. Additionally, some embodiments also comprise an aromatic phosphate ester compound as described below. Shaped articles comprising the polymer compositions of the embodiments show enhanced physical or mechanical properties as compared to other compositions. The shaped articles of the embodiments also demonstrate improved flame retardancy and thermal stability over compositions. In addition, shaped articles also demonstrate reduced moisture absorption and reduced heat sag over compositions less one or more components, or over compositions comprising different flame retardants. As will be discussed, the shaped articles according to some embodiments have good moisture resistance and low heat sag, while maintaining a good balance of other physical and mechanical properties.

In embodiments, a composition comprises a rubber-modified aromatic vinyl resin and a cyclic phosphonate ester. In certain embodiments, the cyclic phosphonate ester is represented by Formula (I):

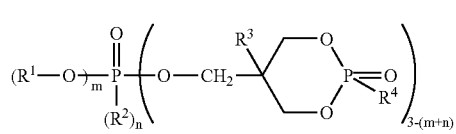

(I)

In the formula, $R^1$, $R^2$ and $R^4$ are independently $C_2$-$C_{10}$ alkyl group. In embodiments, $R^3$ is ethyl. In certain embodiments, m and n are independently 0, 1 or 2, and (m+n) is 1 or 2.

Some embodiments of the polymer composition additionally comprise one or more aromatic phosphate esters as described herein. In some particular embodiments, the polymer compositions may also comprise one or more thermoplastic resins.

These components are further described herein:

(A) Rubber-Modified Aromatic Vinyl Resin

The rubber-modified aromatic vinyl resin can be a polymer in which rubber phase polymers are dispersed in the form of particles in a matrix of aromatic vinyl polymers. Generally, rubber-modified aromatic vinyl resins may be prepared by polymerizing the vinyl group-containing monomers with rubbers. In one embodiment, the rubber-modified aromatic vinyl resin comprises (a1) an aromatic vinyl graft copolymer resin. In another embodiment, the rubber-modified aromatic vinyl resin comprises ($a_1$) an aromatic vinyl graft copolymer resin and ($a_2$) an aromatic vinyl copolymer resin. The components of rubber-modified aromatic vinyl resins are further described below:

(a1) Aromatic Vinyl Graft Copolymer

In some embodiments, the rubber-modified aromatic vinyl resin comprises an aromatic vinyl graft copolymer resin. In some embodiments, the graft copolymer resin is a styrene-containing graft copolymer resin. The aromatic vinyl graft copolymer resins, of some embodiments, comprise about 5 to about 65 percent by weight of a rubber, about 30 to about 94 percent by weight of an aromatic vinyl monomer repeating unit, and about 1 to about 20 percent by weight of a vinyl monomer repeating unit. In particular embodiments, an aromatic vinyl monomer and a vinyl monomer are copolymerized and grafted to the rubber core of the aromatic vinyl graft copolymer.

The aromatic vinyl graft copolymer resin may comprise repeating groups of styrene monomers, including by not limited to, styrene, α-methyl styrene, p-methyl styrene, o-methyl styrene, m-methyl styrene, ethyl styrene, iso-butyl styrene, tert-butyl styrene, a halogenated styrene, and so forth. Some of these monomers and the polymers made from such monomers can be made more impact resistant by the inclusion of elastomeric materials (rubbers) in the matrix or continuous phase of the composition.

In some embodiments, rubbers can include diene rubbers such as polybutadiene, poly(styrene-butadiene), poly(acrylonitrile-butadiene), etc; saturated rubbers in which hydrogen is added to said diene-containing rubber; isoprene rubber, chloroprene rubber; acryl rubbers such as polybutyl acrylic acid; and terpolymer of ethylene-propylene-diene (EPDM). In some embodiments, the average size of rubber particles is preferably in the range of from about 0.1 to about 0.4 μm.

In some embodiments of the aromatic vinyl graft copolymer resin, at least one other monomer (referred to above as the vinyl monomer) copolymerizable with the aromatic vinyl monomer (e.g, styrenic monomers) can be introduced. These monomers may include a cyanide vinyl-containing compound such as acrylonitrile or methacrylonitrile. For example, styrene monomers may be reacted with acrylonitrile monomers to form styrene-acrylonitrile (SAN) copolymers. This copolymer may then be grafted on a rubber core to form the aromatic vinyl graft copolymer.

Some embodiments of the aromatic vinyl graft copolymer may also include monomer repeating units such as the repeating unit of the monomers acrylic acid, methacrylic acid, maleic anhydride, N-substituted maleimide, and the like. These repeating units may be present in about 0 to about 20 percent by weight based on the weight of the aromatic vinyl graft copolymer totaling 100 parts by weight.

Examples of suitable aromatic vinyl graft copolymer resins include, but are not limited to, graft polymers of aromatic vinyl compounds such as acrylonitrile-butadiene-styrene (g-ABS), acrylonitrile-acrylic rubber-styrene (g-AAS), acrylonitrile-ethylenepropylene rubber styrene copolymer (AES resin), methyl methacrylate-butadiene rubber-styrene copolymer (MBS resin), and acrylonitrile-butadiene rubber-styrene-methyl methacrylate copolymer (ABSM resin).

In some embodiments, the rubber-modified aromatic vinyl resin may comprise from about 20 to about 100 weight percent of the aromatic vinyl graft copolymer, including about 20, 25, 30, 35, 40, 45, 50, 55, 60, 65, 70, 75, 80, 85, 90, 95, and 100 weight percent of the aromatic vinyl graft copolymer.

(a2) Aromatic Vinyl Resin

In some embodiments, the rubber-modified aromatic vinyl resin comprises an aromatic vinyl resin, in addition to the previously described aromatic vinyl graft copolymer. In some particular embodiments the aromatic vinyl resin is a styrene-containing copolymer. In some embodiments, the aromatic vinyl resin is not a graft copolymer.

In some embodiments, the aromatic vinyl resin is a copolymer of one or more aromatic vinyl monomers and one or more vinyl cyanide monomers. In some embodiments, the aromatic vinyl resin comprises about 60 to about 90 percent by weight of repeating unit(s) of the one or more aromatic vinyl monomers and about 10 to about 40 percent by weight of repeating unit(s) of the one or more vinyl cyanide monomers, based on the total weight of the aromatic vinyl resin.

Suitable aromatic vinyl monomers include, but are not limited to, styrene, α-methyl styrene, p-methyl styrene, styrene epoxide, and 1-vinylnapthalene. As noted above, the aromatic vinyl resin may comprise one or more repeating units of any of the foregoing monomers.

Suitable vinyl cyanide monomers include, but are not limited to, acrylonitrile, and methacrylonitrile. As noted above, the aromatic vinyl resin may comprise one or more repeating units of any of the foregoing monomers. One nonlimiting examples of a suitable aromatic vinyl resin includes, but is not limited to, styrene-acrylonitrile (SAN) copolymer.

In some embodiments, rubber-modified aromatic vinyl resin (A) may be prepared by methods such as emulsion polymerization, suspension polymerization, and bulk polymerization. The rubber-modified aromatic vinyl resin may generally be prepared by mixing the aromatic vinyl graft copolymer (a1) with the aromatic vinyl copolymer (a2) by any conventional means, and then extruding the mixture. In some embodiments, the components of the rubber-modified aromatic vinyl resin may be prepared in a one step, bulk polymerization.

One non-limiting example of a rubber-modified aromatic vinyl resin includes, but is not limited to, a mixture of a grafted-ABS resin and SAN copolymer resin.

The rubber modified aromatic vinyl resin (A) is also used as the base resin for determining the amounts of the other components of the polymer composition. Thus, in the polymer compositions described herein, amounts of the other components, such as the cyclic alkyl phosphonate ester compounds, are based on about 100 parts by weight of the rubber-modified aromatic resin, unless otherwise specified.

(B) Cyclic Alkyl Phosphonate Ester Compound

In some embodiments, a cyclic alkyl phosphonate ester compound is represented by the following chemical Formula (I):

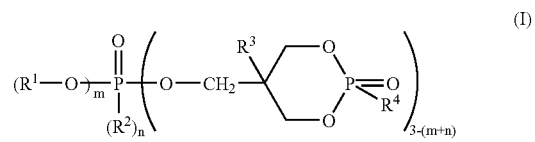

In the formula, $R^1$, $R^2$ and $R^4$ are independently $C_{2-10}$ alkyl, $R^3$ is ethyl, m and n are independently 0, 1 or 2, and (m+n) is 1 or 2.

In some embodiments, $R^1$, $R^2$ or $R^4$ can be ethyl, propyl, butyl, pentyl, hexyl, heptyl, octyl, nonyl, and decyl. $R^1$, $R^2$ or $R^4$ may also be branched to form a substituent of up to 10 carbons. For example, $R^1$, $R^2$ or $R^4$ may be tert-butyl, sec-butyl, or n-butyl. Another example would be n-heptyl that can be substituted with up to three methyl groups at any position on the heptyl carbon chain. Yet another example would be 4-methyl octyl. In some embodiments, $R^1$, $R^2$ or $R^4$ are not methyl.

In some embodiments, more than one cyclic alkyl phosphonate ester compound according to the above Formula (I) may be used in a mixture.

In some embodiments, more than one cyclic alkyl phosphonate ester compound may be used in a mixture. For example, a mixture of cyclic alkyl phosphonate ester compounds may include about 0 to about 90 weight percent of butyl-bis[(5-ethyl-2-butyl-1,3,2-dioxaphorinan-5-yl)methyl]ester P,P'-dioxide phosphonate where $R_1$, $R_2$ and $R_4$ are butyl, $R_3$ is ethyl, m is 0 and n is 1, and about 10 to about 100 weight percent of butyl-(5-ethyl-2-butyl-1,3,2-dioxaphorinan-5-yl)methyl butyl ester P-oxide phosphonate where $R_1$, $R_2$ and $R_4$ are butyl, $R_3$ is ethyl, m is 1, and n is 1. Another embodiment of the mixture may include about 0 to about 90 weight percent of hexyl-bis[(5-ethyl-2-hexyl-1,3,2-dioxaphorinan-5-yl)methyl ester P,P'-dioxide phosphonate where $R_1$, $R_2$ and $R_4$ are hexyl, $R_3$ is ethyl, m is 0, and n is 1, and about 10 to weight percent of hexyl-(5-ethyl-2-hexyl-1,3,2-dioxaphorinan-5-yl)methyl]hexyl ester P-oxide phosphonate where $R_1$, $R_2$ and $R_4$ are hexyl, $R_3$ is ethyl, m is 1, and n is 1. However, $R_1$, $R_2$, and $R_4$ need not be the same substituent in the compound. For example, $R_1$ may be ethyl, $R_2$ may be pentyl, and $R_4$ may be hexyl in the same phosphonate compound.

In some embodiments, the polymer composition comprises about 0.1 to about 10 parts by weight of a cyclic alkyl phosphonate ester compound, based on about 100 parts by weight of the rubber-modified aromatic vinyl resin. In other embodiments, the polymer composition comprises about 0.03, 0.05, 0.07, 0.09, 0.1, 0.3, 0.5, 0.75, 0.9, 1, 2, 4, 5, 7, 8, 9, 10, 11, 12, 14, 16, 18, and 20 parts by weight of the cyclic alkyl phosphonate ester compound based on the total weight of the rubber-modified aromatic vinyl resin being 100 parts by weight.

(C) Aromatic Phosphate Ester Compound

In some embodiments, the polymer composition comprises an aromatic phosphate ester compound comprising the following structural Formula (II):

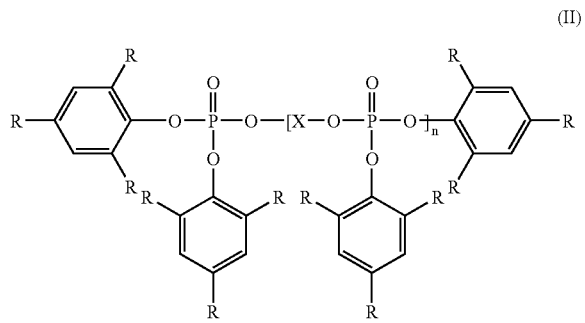

(II)

In formula (II), R on each phenyl group are each independently hydrogen, alkyl, or substituted alkyl, and are independent of an R on a different phenyl group. For example, R can be selected from methyl, ethyl, propyl, isopropyl, butyl, sec-butyl, tert-butyl. In some embodiments, R is selected from independent alkyl groups which comprise from two to four carbon atoms. However, embodiments are not limited to four carbon chains and may be branched alkyl groups. R may be selected independent from another R on the same or a different phenyl group of the aromatic phosphonate ester compound.

In formula (II), X is derived from an aryl compound comprising one or more hydroxy groups. In the formula, n is 0 to 4, including 0, 1, 2, 3 or 4.

For example, if X is derived from hydroquinone, then X would be a phenylene wherein a phenyl group would be disposed between the two oxygen atoms shown in the structural formula (as connected to X), and these oxygen atoms would be covalently bonded to the phenylene group in respective para positions. For another example, if X is derived from resorcinol, then X would be a phenylene wherein a phenyl group would be disposed between the two oxygen atoms shown in the structural formula (as connected to X), and these oxygen atoms would be covalently bonded to the phenylene group in respective meta positions. Other variations of this will be apparent to those having ordinary skill in the art. Thus, X can be derived from compounds such as hydroquinone, resorcinol, bisphenol A, naphthalene-2,6-diol, naphthalene-2,7-diol, and so forth. Thus, in some embodiments, X is arylene or multiple aryl groups.

Where n is 0, the aromatic phosphate ester compound may be triphenyl phosphate, tricresyl phosphate, trixylenyl phosphate, tri(2,6-dimethyl phenyl)phosphate, tri(2,4,6-trimethyl phenyl)phosphate, tri(2,4-ditertiary butyl phenyl)phosphate, tri(2,6-ditertiary butyl phenyl phosphate, and the like; where n is 1, the aromatic phosphate ester compound may include resorcinol bis(diphenyl)phosphate, resorcinol bis(2,6-dimethyl phenyl)phosphate, resorcinol bis(2,4-ditertiary butyl phenyl)phosphate, hydroquinone bis(2,6-dimethyl phenyl) phosphate, hydroquinone bis(2,4-ditertiary butyl phenyl) phosphate, and the like. The aromatic phosphate ester compound can be used alone or in combination with other aromatic phosphate ester compounds.

In some embodiments, the polymer composition comprises about 0.1 to about 30 parts by weight of the aromatic phosphate compound, including about 0.1, 0.2, 0.3, 0.4, 0.5, 0.6, 0.7, 0.8, 0.9, 1, 1.5, 2, 2.5, 3, 3.5, 4, 4.5, 5, 6, 7, 8, 9, 10, 12, 14, 16, 18, and 20 parts by weight, based on about 100 parts by weight of the rubber-modified aromatic vinyl resin. Other embodiments may also comprise about 0.1 to about 10 parts by weight.

(D) Thermoplastic Resin

Some embodiments may additionally comprise an additional thermoplastic resin. Examples of suitable thermoplastic resins that include, but are not limited to, one or more thermoplastic resins selected from polystyrene resins (PS resins), acrylonitrile-butadiene-styrene copolymer resins (ABS resins), acrylonitrile-styrene copolymer resins (SAN resins), rubber-modified polystyrene resin (HIPS), acrylonitrile-styrene-acrylate copolymer resins (ASA resins), methylmethacrylate-butadiene-styrene copolymer resins (MBS resins), acrylonitrile-ethylacrylate-styrene copolymer resins (AES resins), polycarbonate (PC) resins, polyethylene (PE) resins, polypropylene (PP) resins, polyethylene terephthalate (PET), polybutylene terephthalate (PBT), polyvinyl chloride (PVC), polymethyl methacrylate (PMMA), polyamide (PA) resins, and copolymers thereof.

In any embodiment of the polymer composition which comprises an additional thermoplastic resin as described above, the thermoplastic resin is about 0.1 to about 20 parts by weight, based on the additional thermoplastic resin and the rubber modified aromatic vinyl resin totaling about 100 parts by weight of the polymer composition.

Additional Components

According to embodiments, the polymer composition may contain one or more compounds or polymers in addition to the foregoing components. Additional components or additives may be added to provide additional properties or characteristics to the polymer composition or to modify existing properties of the composition. Other additives that may be contained in the polymer composition include, but are not limited to, a conventional flame retardant, an anti-dripping agent, an impact modifier, a plasticizer, inorganic filler, a heat stabilizer, an anti-oxidant, a compatibilizer, a light stabilizer, a lubricant, a pigment, and/or dye. The additives are employed in the amount of about 0 to about 30 parts by weight on the basis of 100 parts by weight of the rubber-modified aromatic vinyl resin. For example, an inorganic filler such as glass fiber, carbon fiber, talc, silica, mica, and alumina may be added to improve mechanical strength and heat distortion temperature of the resin composition. One of ordinary skill in the art will appreciate that various additives may be added to the compositions according to embodiments of the invention.

Polyphenylene Ether Resin

Polyphenylene ether has been extensively used due to its superiority in its mechanical properties, electrical properties and heat resistance and further superiority in its dimensional stability. Polyphenylene ether may be a homopolymer and/or a copolymer comprising a structural unit of the following Formula:

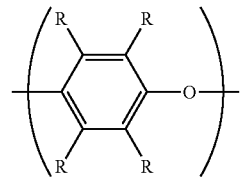

wherein R may independently represent hydrogen, halogen, alkyl, aryl, substituted alkyl, substituted aryl, hydrocarbyloxy, and combinations thereof.

In certain embodiments, the polymer composition does not comprise a polyphenylene ether resin. In other embodiments, the polymer composition is substantially free of a polyphenylene ether resin. For example, in some embodiments, the composition comprises less than about 4 parts by weight of the polyphenylene ether resin, based on 100 parts by weight of the rubber modified aromatic vinyl resin. In another embodiment, the composition comprises less than about 2 parts by weight of the polyphenylene ether resin, based on 100 parts by weight of the rubber modified aromatic vinyl resin. In another embodiment, the composition comprises less than about 1 parts by weight, including about 0.9, 0.8, 0.7, 0.6, 0.5, 0.4, 0.3, 0.2, and 0.1 parts by weight, of the polyphenylene ether resin, based on 100 parts by weight of the rubber modified aromatic vinyl resin.

The compositions described herein exhibit improved properties over composition containing a polyphenylene ether resin. For example, polymer compositions as described herein which are substantially free of polyphenylene ether resin demonstrate improved heat resistance as compared to those compositions containing a polyphenylene ether resin. Another advantage of certain embodiments is that polymer compositions which are substantially or completely free of polyphenylene ether resins are cheaper to produce. Another advantage of certain embodiments is that polymer compositions which are substantially or completely free of polyphenylene ether resins have good weatherability compared to polymer compositions which contain the polyphenylene ether resins. Yet another advantage of certain embodiments is the low formation temperatures at which the compositions is produced.

Preparation of Embodiments of Compositions

In some embodiments, the polymer compositions are prepared by mixing their components including a rubber-modified aromatic vinyl resin and a cyclic phosphonate ester compound. In some embodiments, one or more other additives may be mixed together with the components of the polymer composition. In some embodiments, one or more component resins may be heated to melt prior to the mixing or the composition may be heated during the mixing. The mixing may occur when each components is in a solid, liquid, or dissolved state, or mixtures thereof. In one embodiment, the above components are mixed together all at once. Alternatively, one or more components are added individually. For example, the aromatic vinyl resin may first be mixed with the impact modifier, prior to mixing this admixture with the remaining components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

Enhanced Properties

An advantage of certain preferred embodiments is that they provide polymer compositions which have good flame retardancy, impact strength, heat resistance, moisture resistance, and/or limited heat sag.

As noted above, one advantage of certain embodiments is that the composition shows enhanced physical or mechanical properties as compared to other polymer composition containing a cyclic phosphonate esters represented by Formula (I) wherein $R_1$, $R_2$, or $R_4$ is a methyl group. For example, polymer compositions comprising a compound represented by Formula (I) wherein $R_1$, $R_2$, and/or $R_4$ is methyl demonstrate reduced moisture resistance and increased heat sag as compared to compositions comprising a compound represented by Formula (I) wherein $R_1$, $R_2$, and/or $R_4$ are not $C_2$-$C_{10}$ alkyl.

In addition, certain embodiments of the compositions have excellent flame retardancy. In some embodiments, when samples of the shaped articles are tested under the standard UL94 (1/12"), the samples had a flame retardancy of V-2. In some embodiments, when samples of the shaped articles are tested under the standard UL94 (1/8"), the samples had a flame retardancy of V-2.

Additionally, some embodiments of the composition also demonstrate a moisture absorption rate less than or equal to about 0.5% when a specimen of the composition, the specimen measuring 125 mm (width)×13 mm (length)×1.6 mm (thickness), is submerged in a thermostatic bath at 70° C. for 40 hours. Some embodiments of the composition also demonstrate a moisture absorption rate less than or equal to about 0.4% when a specimen of the composition, the specimen measuring 125 mm (width)×13 mm (length)×1.6 mm (thickness), is submerged in a thermostatic bath at 70° C. for 40 hours. Some embodiments of the composition also demonstrate a moisture absorption rate less than or equal to about 0.3% when a specimen of the composition, the specimen measuring 125 mm (width)×13 mm (length)×1.6 mm (thickness), is submerged in a thermostatic bath at 70° C. for 40 hours.

Some embodiments of the composition also demonstrate a heat sag of less than or equal to about 22 mm when a specimen of the composition, measuring 125 mm (width)×13 mm (length)×1.6 mm (thickness), is tested according to ASTM-D3769 at 70° C. for 8 hours and a humidity of 90%. Some embodiments of the composition also demonstrate a heat sag of less than or equal to about 19 mm when a specimen of the composition, measuring 125 mm (width)×13 mm (length)×1.6 mm (thickness), is tested according to ASTM-D3769 at 70° C. for 8 hours and a humidity of 90%. Some embodiments of the composition also demonstrate a heat sag of less than or equal to about 18 mm when a specimen of the composition, measuring is tested according to ASTM-D3769 at 70° C. and a humidity of 90%.

Shaped Articles of Electronic Devices

Another embodiment provides a shaped article using the polymer composition according to the foregoing embodiments. The compositions may be molded into various shapes. For molding with the composition, an extrusion molding machine such as a vented extruder may be used. The polymer composition of embodiments may be molded into various moldings using, for example, a melt-molding device. In embodiments, the polymer composition is formed into a pellet, which then may be molded into various shapes using, for example, injection molding, injection compression molding, extrusion molding, blow molding, pressing, vacuum forming or foaming. In one embodiment, the polymer composition can be made into a pellet using melt-kneading, and the resulting pellets are molded into moldings through injection molding or injection compression molding.

As noted, in one embodiment, the thermioplastic compositions are formed into pellets. In other embodiments, the thermoplastic compositions are formed into structural parts of various consumer products, including electronic devices and appliances. In some embodiments, the polymer compositions are molded into a housing or body of electronic or non-electronic devices. Examples of electrical devices in which a molded article made of the blend of the composition according to embodiments of the invention include printers, computers, word processors, keyboards, personal digital assistants (PDA), telephones, mobile phones, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, game machines, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

The features of the invention may be further described with reference to the following examples. These examples are intended for the purpose of illustration and are not to be construed any way as to limit the scope of the present invention.

EXAMPLES

In the following examples, the polymer composition comprises a rubber-modified aromatic vinyl resin and at least one cyclic alkyl phosphonate ester. The rubber-modified aromatic vinyl resin comprises a styrene-containing graft copolymer resin and an aromatic vinyl resin. Other examples also include an aromatic phosphate ester compound as described herein. The amount of the resins and compounds used in the examples are listed in Table I. The amount of the resins and compounds used in the comparative examples are listed in Table II. The components of the examples and comparative examples are further described below:

(A) Rubber-Modified Aromatic Vinyl Resin

The rubber-modified aromatic vinyl resin (A) used in the following examples and comparative examples was prepared by mixing and kneading an aromatic vinyl graft copolymer resin (a1) and an aromatic vinyl resin (a2). The aromatic vinyl graft copolymer resin (a1) and the aromatic vinyl resin (a2) were prepared in accordance with the following procedures.

(a1) Styrene-Containing Graft Copolymer Resin

For the styrene-containing graft copolymer resin, an ABS resin was used in the following examples and comparative examples prepared in accordance with the following procedure. First, 50 parts by weight of butadiene rubber latex, based on solids content, was fed into a reactor, and then 36 parts by weight of styrene, 14 parts by weight of acrylonitrile and 150 parts by weight of deionized water, based on the total solids content, were added thereto. To the blend, 1.0 part by weight of potassium oleate, 0.4 parts by weight of cumene hydroperoxide, 0.2 parts by weight of a mercaptan-containing chain transfer agent, 0.4 parts by weight of glucose, 0.01 parts by weight of ferrous sulfate hydrate and 0.3 parts by weight of sodium pyrophosphate were added. The blend was allowed to react at 75° C. for 5 hours to obtain a graft copolymer resin latex. To the resin latex, 0.4 parts by weight of sulfuric acid was added, based on the solids content of the resin, followed by coagulation to obtain the styrene-containing graft copolymer resin in a powder form.

(a2) Aromatic Vinyl Resin

For the aromatic vinyl resin, SAN copolymer was used in the following examples and comparative examples, and was prepared in accordance with the following procedure. First, 75 parts by weight of styrene, 25 parts by weight of acrylonitrile, 120 parts by weight of deionized water, 0.2 parts by weight of azobis isobutyronitrile, 0.4 parts by weight of tricalcium phosphate, and 0.2 parts by weight of a mercaptan-containing chain transfer agent were blended. The blend was heated from room temperature to 80° C. over a period of 90 minutes, and maintained for 180 minutes. The resultant blend was washed with water, dehydrated and dried to produce the SAN copolymer resin in a powder form. The styrene-acrylonitrile (SAN) copolymer resin had a weight average molecular weight of 80,000 to 100,000.

(B) Cyclic Alkyl Phosphonate Ester Compound (b1) and (b2) were used as cyclic alkyl phosphonate ester compounds in the examples, while (b3) and (b4) were used as cyclic alkyl phosphonate ester compounds in the comparative examples. (b1), (b2), (b3) and (b4) are described below.

(b1): SDP-M by Rhodia Co. [a mixture of 22% by weight of butyl-(5-ethyl-2-butyl-1,3,2,-dioxaphosphorinan-5-yl)methyl butyl ester (P-oxide phosphonate), which is the compound of Formula 1 wherein $R_1$, $R_2$ and $R_4$ are butyl, $R_3$ is ethyl, m is 1 and n is 1, and 71% by weight of butyl-bis[(5-ethyl-2-butyl-1,3,2,-dioxaphosphorinan-5-yl)methyl]ester (P,P'-dioxide phosphonate), which is the compound of Formula 1 wherein $R_1$, $R_2$ and $R_4$ are butyl, $R_3$ is ethyl, m is 0 and n is 1.] was used.

(b2): SDP-M/H by Rhodia Co. [a mixture of 39% by weight of hexyl-(5-ethyl-2-hexyl-1,3,2,-dioxaphosphorinan-5-yl)methyl hexyl ester (P-oxide phosphonate), which is the compound of Formula 1 wherein $R_1$, $R_2$ and $R_4$ are hexyl, $R_3$ is ethyl, m is 1 and n is 1, and 53% by weight of hexyl-bis [(5-ethyl-2-hexyl-1,3,2,-dioxaphosphorinan-5-yl)methyl]ester (P,P'-dioxide phosphonate), which is the compound of Formula 1 wherein $R_1$, $R_2$ and $R_4$ are hexyl, $R_3$ is ethyl, m is 0 and n is 1 was used.

(b3): Antiblaze 1045 by Rhodia Co. which contains 20.8% by weight of phosphorus [a mixture of 8% by weight of methyl-(5-ethyl-2-methyl-1,3,2,-dioxaphosphorinan-5-yl) methyl methyl ester (P-oxide phosphonate), which is the compound of Formula 1 wherein $R_1$, $R_2$ or $R_4$ is methyl ($C_1$), and 85% by weight of methyl-bis[(5-ethyl-2-methyl-1,3,2,-dioxaphosphorinan-5-yl)methyl]ester (P,P'-dioxide phosphonate], which is the compound of Formula 1 wherein $R_1$, $R_2$ or $R_4$ is methyl ($C_1$).] was used.

(b4): DCU by Rhodia Co. [a mixture of 26% by weight of decyl-(5-ethyl-2-methyl-1,3,2,-dioxaphosphorinan-5-yl)methyl methyl ester (P-oxide phosphonate), which is the compound of Formula 1 wherein $R_1$, $R_2$ or $R_4$ is methyl ($C_1$), and 68% by weight of decyl-bis[(5-ethyl-2-methyl-1,3,2,-dioxaphosphorinan-5-yl)methyl]ester (P,P'-dioxide phosphonate), which is the compound of Formula 1 wherein $R_1$, $R_2$ or $R_4$ contains methyl ($C_1$) was used.

(C) Aromatic Phosphate Ester Compound

As an aromatic phosphate ester compound used in the following examples and comparative examples, resorcinol bis(2,6-dimethylphenyl)phosphate (PX200, Daihachi Chemical, Japan) was used.

(D) Thermoplastic Resin

For the thermoplastic resin, poly(ethylene-1,4-cyclohexanedimethyleneterephthalate) (PETG), available as SKYGREEN K2012 Grade from SK Chemicals (Seoul, Korea) was used.

Examples 1 to 8

The components (A)-(D) were mixed as shown in Table 1 and Table 2 and each of the mixtures was extruded at 180-250° C. with a conventional twin-screw extruder in the form of pellets. The resin pellets were dried at 80° C. for 3 hours, and molded into test specimens using a 6 oz injection molding machine at 180-280° C. and a mold temperature of 40-80° C. The flame retardancy and physical properties of the test specimens were evaluated according to the following procedures.

The flame retardancy of the test specimens was measured in accordance with UL 94 VB with thicknesses of 1/12" and 1/8". The notched Izod impact strength (kgf·cm/cm) of the test specimens was measured in accordance with ASTM 256A with a thickness of 1/8" at 23° C. The heat resistance was measured according to ASTM D 1525 under a load of 5 kgf.

For sample specimens measuring 125 mm(width×13 mm(length)×1.6 mm(thickness), moisture absorption and heat sage were measured. The moisture absorption rate was measured by allowing the test specimens to stand in a thermostatic bath at 70° C. for 40 hours and measuring a change in weight. The heat sag was measured using the test specimens in a constant temperature/humidity oven at a temperature of 70° C. for 8 h and a humidity of 90%. All other conditions for measurements of heat sag were made in accordance with ASTM D3769.

The physical properties of the examples were evaluated, and the results are presented in Table 1.

TABLE 1

| Components | | Example No. | | | | | | | |
|---|---|---|---|---|---|---|---|---|---|
| | | 1 | 2 | 3 | 4 | 5 | 6 | 7 | 8 |
| (A) Rubber-modified | (a1) | 30 | 30 | 30 | 30 | 30 | 30 | 30 | 30 |
| aromatic vinyl resin | (a2) | 70 | 70 | 70 | 70 | 70 | 70 | 70 | 60 |
| (B) Cyclic alkyl | (b1) | 4 | — | 2 | 3 | 1 | — | — | 4 |
| phosphonate ester compound | (b2) | — | 4 | — | — | — | 3 | 1 | — |
| (C) Aromatic phosphate ester compound | | — | — | 2 | 1 | 3 | 1 | 3 | — |
| (D) Thermoplastic resin | | — | — | — | — | — | — | — | 10 |
| UL94 Flame retardancy, 1/12" | | V2 | V2 | V2 | V2 | V2 | V2 | V2 | V2 |
| UL94 Flame retardancy, 1/8" | | V2 | V2 | V2 | V2 | V2 | V2 | V2 | V2 |
| Izod impact strength, 1/8" (kgf·cm/cm) | | 21 | 20 | 20 | 20 | 19 | 19 | 19 | 18 |
| Heat resistance (° C.) | | 95 | 95 | 94 | 95 | 94 | 95 | 95 | 93 |
| Moisture absorption rate (%) | | 0.4 | 0.3 | 0.4 | 0.4 | 0.3 | 0.3 | 0.3 | 0.5 |
| Heat Sag (mm) | | 19 | 18 | 18 | 19 | 18 | 18 | 19 | 22 |

Comparative Examples 1 to 9

Test specimens were produced in the same manner as in Example 1, except that the compositions were changed to those shown in Table 2. The physical properties of the compositions were evaluated, and the results are presented in Table 2. Note that all values are parts by weight, unless otherwise specified.

TABLE 2

| Components | | Comparative Example No. | | | | | | | | |
|---|---|---|---|---|---|---|---|---|---|---|
| | | 1 | 2 | 3 | 4 | 5 | 6 | 7 | 8 | 9 |
| (A) Rubber-modified | (a1) | 30 | 30 | 30 | 30 | 30 | 30 | 30 | 30 | 30 |
| aromatic vinyl resin | (a2) | 70 | 70 | 70 | 70 | 70 | 70 | 70 | 70 | 60 |
| (B) Cyclic alkyl | (b3) | 4 | — | 3 | 1 | — | — | — | — | 4 |
| phosphonate ester | (b4) | — | 4 | — | — | 3 | 1 | — | — | — |
| (C) Aromatic phosphate ester compound | | — | — | 1 | 3 | 1 | 3 | 4 | 6 | — |
| (D) Thermoplastic resin | | — | — | — | — | — | — | — | — | 10 |
| UL94 Flame retardancy, 1/12" | | V2 | V2 | V2 | V2 | V2 | V2 | V2 | V2 | V2 |
| UL94 Flame retardancy, 1/8" | | V2 | V2 | V2 | V2 | V2 | V2 | Fail | V2 | V2 |
| Izod impact strength, 1/8" (kgf·cm/cm) | | 20 | 20 | 20 | 20 | 19 | 19 | 19 | 16 | 17 |
| Heat resistance (° C.) | | 94 | 95 | 94 | 94 | 95 | 94 | 94 | 88 | 92 |
| Moisture absorption rate (%) | | 2.3 | 2.2 | 1.5 | 1.0 | 1.4 | 1.1 | 0.3 | 0.3 | 2.5 |
| Heat Sag (mm) | | 36 | 34 | 28 | 24 | 29 | 24 | 19 | 41 | 38 |

As can be seen from the data shown in Table 1, the compositions prepared using the cyclic alkyl phosphonate ester compound as a flame retardant showed high impact strength, superior heat resistance, low moisture absorption rate, low heat sag and improved flame retardancy.

From the evaluation of the moisture absorption rate and heat sag of the test specimens produced in Examples 1-7 and Comparative Examples 1-6, it could be confirmed that the compositions employing cyclic alkyl phosphonate ester compounds (b1) and (b2), which are the compounds in Formula 1 wherein $R^1$, $R^2$ and $R^4$ are butyl or hexyl, had a lower moisture absorption rate and less deformation at a high temperature and a high humidity than the compositions employing cyclic alkyl phosphonate ester compounds (b3) and (b4), which are the compounds in Formula 1 wherein at least one of $R^1$, $R^2$ and $R^4$ is methyl. Similar results were obtained in the compositions of Example 8 and Comparative Example 9 further comprising the thermoplastic resin in addition to the rubber-modified aromatic vinyl resin.

The results obtained from Comparative Examples 7 and 8 in the evaluation of 1/8" flame retardancy demonstrate that flame retardancy and heat resistance and impact strength were deteriorated when the aromatic phosphate ester compound was used alone, compared to when the cyclic alkyl phosphonate ester compound was used alone or in combination with the aromatic phosphate ester compound.

Therefore, the thermoplastic resin compositions of some embodiments are environmentally friendly, exhibit superior flame retardancy and have a low moisture absorption rate while maintaining the impact strength. In addition, some embodiments have good heat resistance, high mechanical impact strength and superior moldability.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein.

What is claimed is:

1. A composition comprising:
   about 100 parts by weight of a rubber-modified aromatic vinyl resin; and
   about 0.1 to about 10 parts by weight of a cyclic alkyl phosphonate ester compound represented by the following Formula (I):

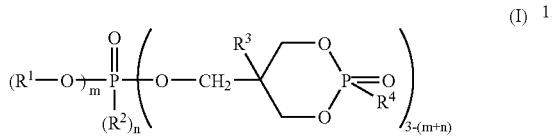

wherein $R^1$, $R^2$ and $R^4$ are independently $C_2$-$C_{10}$ alkyl group, $R^3$ is ethyl, m and n are independently 0, 1 or 2, and (m+n) is 1 or 2.

2. The composition of claim 1, wherein m is 1 or 2.

3. The composition of claim 1, wherein the composition is substantially free of polyphenylene ether resin.

4. The composition of claim 3, wherein the composition has less than 4 parts by weight of a polyphenylene ether resin, based on 100 parts by weight of the rubber-modified aromatic vinyl resin.

5. The composition of claim 3, wherein the composition has less than 2 parts by weight of the polyphenylene ether resin, based on 100 parts by weight of the rubber-modified aromatic vinyl resin.

6. The composition of claim 3, wherein the composition has less than 1 parts by weight of the polyphenylene ether resin, based on 100 parts by weight of the rubber-modified aromatic vinyl resin.

7. The composition of claim 1, wherein the rubber-modified aromatic vinyl resin comprises:
   an aromatic vinyl graft copolymer resin; and
   an aromatic vinyl copolymer resin, wherein the aromatic vinyl copolymer is not a graft copolymer resin.

8. The composition of claim 7, wherein the aromatic vinyl graft copolymer resin is a graft copolymer of a rubber, an aromatic vinyl monomer, and a vinyl monomer.

9. The composition of claim 7, wherein the aromatic vinyl copolymer resin is a copolymer of an aromatic vinyl monomer and a vinyl cyanide monomer.

10. The composition of claim 7, wherein the aromatic vinyl copolymer is substantially free of a rubber polymer.

11. The composition of claim 1, wherein the rubber modified aromatic vinyl resin is a mixture of g-ABS resin and SAN copolymer.

12. The composition of claim 1, further comprising an aromatic phosphate ester.

13. The composition of claim 12, wherein the aromatic phosphate ester is about 0 to about 20 parts by weight based on the rubber-modified aromatic vinyl resin and the polyphenylene ether resin totaling 100 parts by weight of the composition.

14. The composition of claim 1, further comprising a thermoplastic resin.

15. The composition of claim 12, wherein the aromatic phosphate ester is represented by the following Formula (II):

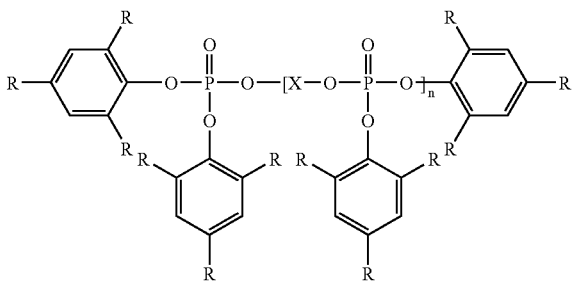

wherein each R is independently hydrogen or $C_{1-4}$ alkyl; X is derived from an aryl compound comprising at least two hydroxy groups; and n is 0 to 4.

16. The composition of claim 1, wherein the composition is in the form a shaped article.

17. A composition comprising:
   a rubber-modified aromatic vinyl resin; and
   a cyclic alkyl phosphonate ester compound represented by the following Formula (I):

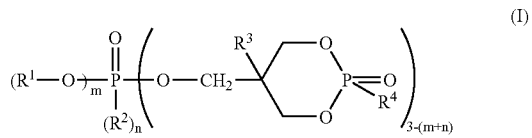

wherein $R^1$, $R^2$ and $R^4$ are independently $C_2$-$C_{10}$ alkyl group, $R^3$ is ethyl, m and n are independently 0, 1 or 2, and (m+n) is 1 or 2;
   wherein the composition is substantially free of a polyphenylene ether resin.

18. A composition of claim 1 wherein $R^3$ is ethyl; m and n are independently 0, 1 or 2, and (m+n) is 1 or 2, and $R^1$, $R^2$ and $R^4$ are independently $C_2$-$C_{10}$ alkyl group when m=1 and $R^1$, $R^2$ and $R^4$ are independently pentyl, hexyl, septyl, octyl, nonyl or decyl group when m=0 and n=1.

19. A composition of claim 1 wherein $R^1$, $R^2$ and $R^4$ are independently butyl, pentyl, hexyl, septyl, octyl, nonyl or decyl group.

20. A composition comprising: a rubber-modified aromatic vinyl resin; and a cyclic alkyl phosphonate ester compound represented by the following Formula (I):

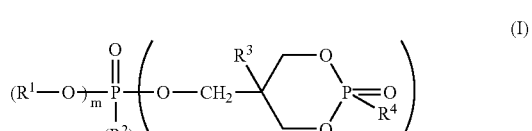

wherein $R^3$ is ethyl; m and n are independently 0, 1 or 2, and (m+n) is 1 or 2 and $R^1$, $R^2$ and $R^4$ are independently $C_2$-$C_{10}$ alkyl group when m=1 and $R^1$, $R^2$ and $R^4$ are independently pentyl, hexyl, septyl, octyl, nonyl or decyl group when m=0 and n=1.

* * * * *